March 19, 1935. J. HARGENS 1,994,818
BEET HARVESTING IMPLEMENT
Filed Oct. 30, 1934    3 Sheets-Sheet 3
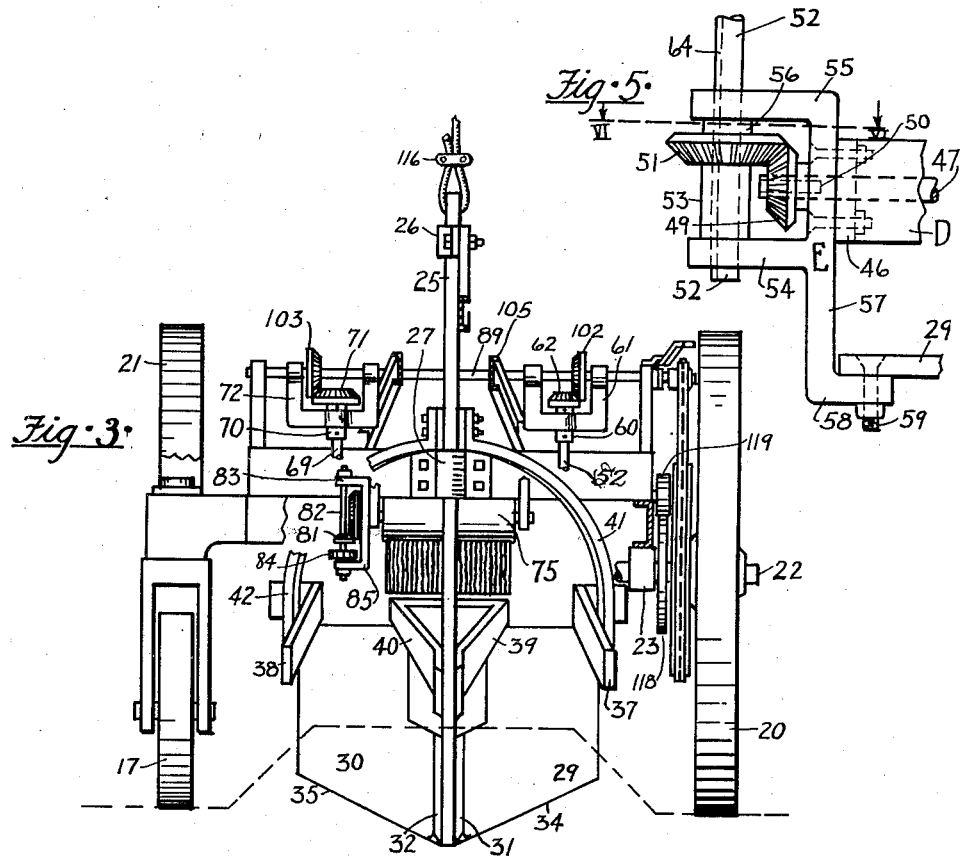
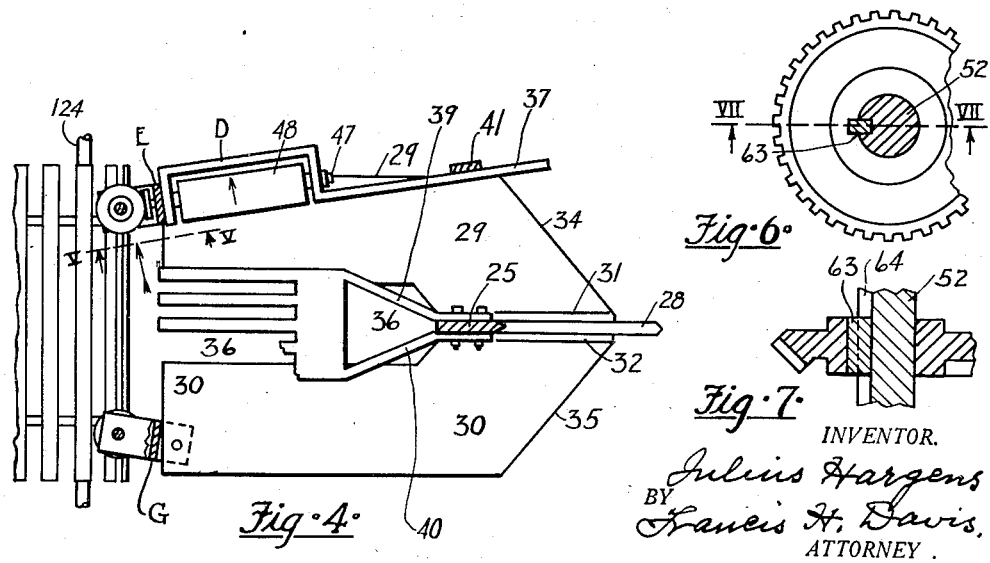
INVENTOR.
Julius Hargens
BY Francis H. Davis,
ATTORNEY.

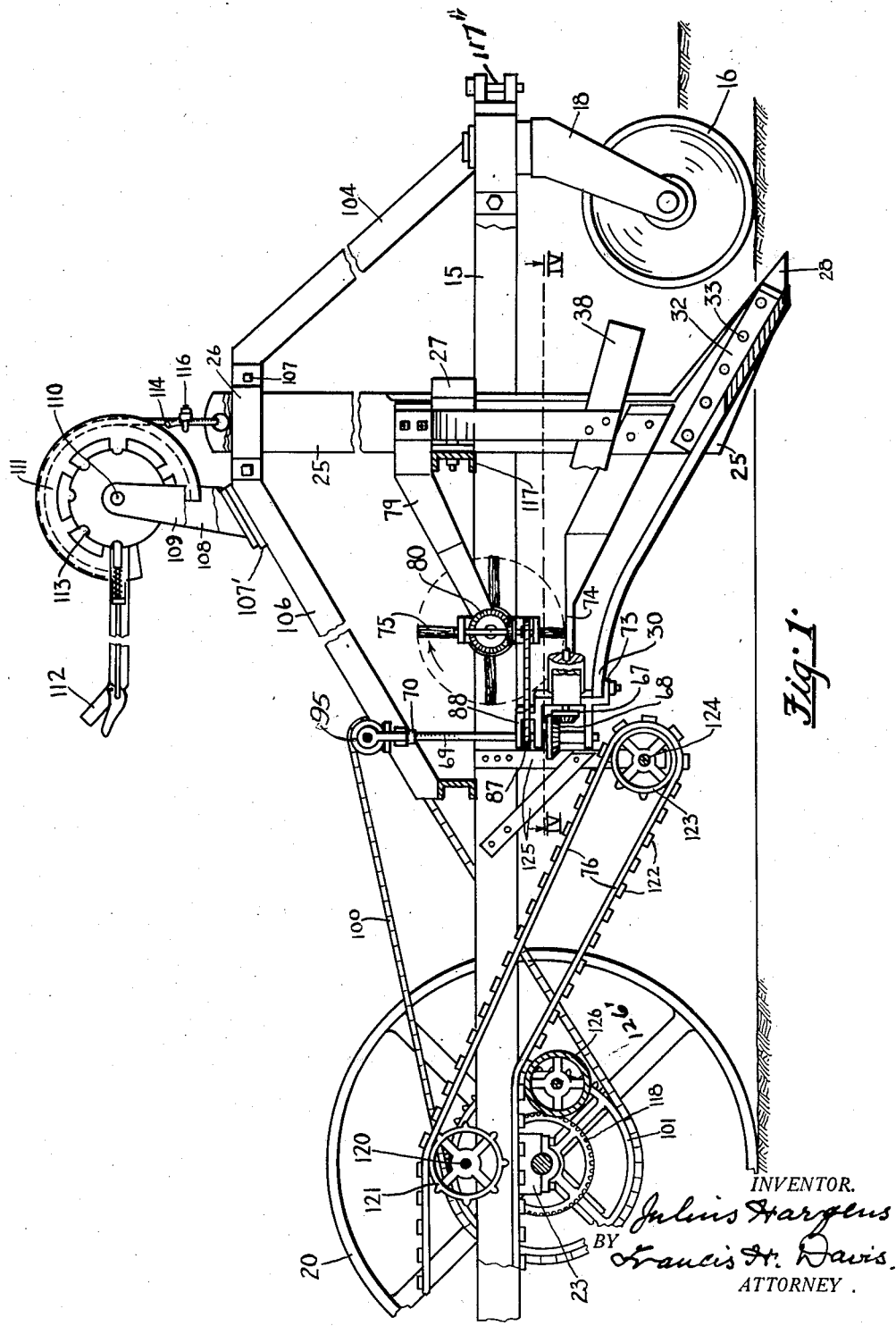

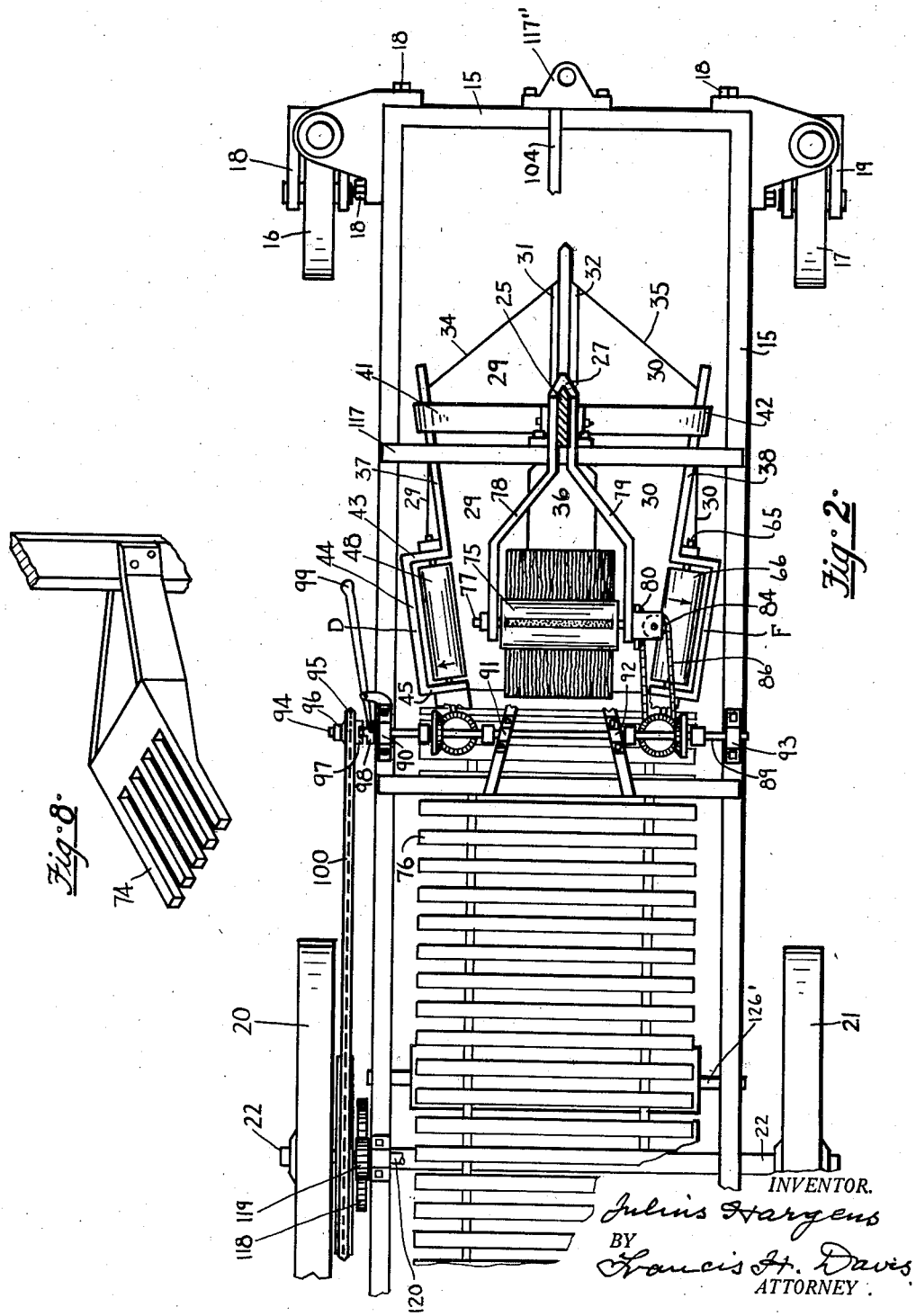

Patented Mar. 19, 1935

1,994,818

UNITED STATES PATENT OFFICE 1,994,818

BEET HARVESTING IMPLEMENT

Julius Hargens, Gonzales, Calif.

Application October 30, 1934, Serial No. 750,719

9 Claims. (Cl. 55—106)

This invention relates broadly to beet harvesting implements, but more particularly to an implement specially adapted to operate on beets grown in double parallel rows, suitably spaced apart upon mounded beds or ridges, in what is known as the California method.

By this method the valleys flanking each bed serve for irrigational flow, and the ground-engaging wheels of the implement are gaged to track in the respective valleys with the implement straddling the bed.

The implement may be traveled along the beds by any suitable tractive agency. The operative parts of the implement may be actuated by power imparted from the ground-engaging wheels or may be supplied by the conventional "take-off" from a tractor.

The objects of my invention comprise the following desiderata:

To provide an implement of the character comprising ground-engaging wheels supporting a suitable frame structure. The forward part of the frame supports a novel composite unit having a standard carrying plow elements adapted to uproot a double row of beets simultaneously and elevate them slidably up said elements as the implement progresses.

To provide means whereby said unit may be lowered or raised into the operative or inoperative positions.

To provide guides adapted to guard the beets from falling off said plow element while being elevated, although permitting soil to be shed.

To provide a longitudinally-slatted table at the upper end of said plow element for the beets to land on transversally of the implement.

To provide rotary means to engage the beets and tilt them transversally on to said table.

To provide said guides in duplicate, one pair of guides for each ascending row of beets.

To provide said rotary means in duplicate, and means to revolve them in opposite directions so as to tilt said respective ascending rows of beets heads-to-heads crosswise on said table.

To provide rotary means to transfer said crosswisely-disposed beets from said table to a conveyor for suitable disposal.

Said plow elements, guides, rotary means to tilt the beets, slatted landing table and means to transfer the beets from said table to a conveyor all being supported from and by said standard and movable up and down coordinately therewith.

To provide adjustable means to drive the various rotary elements, together with other objects and advantages hereinafter appearing, illustrated in the accompanying drawings attached hereto and made part hereof, in which:—

Figure 1 is a side elevational view of the implement of my present invention with parts removed for clarity.

Figure 2 is a top plan view of Figure 1, with parts removed for clarity.

Figure 3 is a front elevational view with parts removed for clarity.

Figure 4 is a top plan view taken on the line IV—IV of Figure 1 with parts removed to better expose the plow elements and the opening between said elements.

Figure 5 is an elevational detail of the bracket E as viewed from the indicating arrow on the line V—V of Figure 4.

Figure 6 is an enlarged plan detail taken on the line VI—VI of Figure 5.

Figure 7 is a section taken on the line VII—VII of Figure 6.

Figure 8 is a perspective view of the longitudinally slatted table.

Similar reference indicia refer to similar parts throughout the several views.

In carrying out my present invention I employ a frame 15 which may be of any suitable construction that will provide the requisite stability and that is adapted to further the ends in view. This frame is supported at the forward end by the caster wheels 16 and 17 mounted in the respective bearings 18 and 19 secured to said frame by bolts as 18; said frame being supported at the rear end upon the ground-engaging wheels 20 and 21. Said rear wheels are a revoluble fit loose upon the driving shaft or axle 22 mounted in suitable bearings as 23 near the rear end of the frame. These rear wheels are arranged to be connected with said axle or driving shaft by the usual escapement, so that when the implement is traveled forward, rotary motion will be imparted to the axle 22 and when the implement is traveled backward the wheels 20 and 21 will turn upon the axle 22 without imparting motion thereto. Said escapement devices being well known and forming no part of the present invention it is unnecessary to describe them in detail.

Suitably disposed toward the forward end of the frame 15, and preferably at a point on the longitudinal axis thereof I locate the standard 25 which is arranged for predetermined up-and-down movement in the guide bearings 26 and 27 by means to be later described.

The standard 25 is a flat steel bar furnished at the bottom end with the forwardly and slightly downwardly-projecting foot portion terminating in the point 28 shown in Figure 1.

Having reference to Figs. 1, 2, 3, and 4 it will be noted that the plow elements 29 and 30 are disposed one on each side of and a little to the rear of the point 28. Said plows are identical except that they are left and right. They are preferably flat sheet steel plates of sufficient thickness. The plow element 29, where it contacts the standard 25, is turned upwardly to form the flange 31. The element 30 is similarly upturned to form the flange 32.

Said elements are removably secured to the lower portion of said standard by bolts as 33 which pass through both said flanges and the contiguous portion of said standard.

Having reference to Figures 2 and 4 it will be seen that from the respective front ends thereof, the elements 29 and 30 extend rearwardly at an oblique angle for their entire width, thus forming the leading edges 34, and 35 which are beveled downwardly to a suitable sharpness.

It will be noted by reference to Figure 4, that, from a point adjacent the rear edge of the standard 25, the inner portions of the respective elements 29 and 30 are cut away to form the opening 36 which extends backwardly for their entire lengths, said respective elements being deflected to about a horizontal plane at their rear ends.

Four guides are now provided to prevent the uprooted beets falling off said elements on the way up; namely, the respective outer guides 37 and 38 carried by the respective arched arms 41 and 42 which are suitably secured to said standard. The guides 39 and 40 attach by their forward ends directly to said standard. All said guides move up or down in unison with said standard and are in spaced relation to said plow elements.

Having reference to Figure 2 it will be noted that the stock of the guide 37, at a point suitably to the rear of the standard 25, is offset at a right angle to form the member 43, said stock is then bent rearwardly to form the member 44 that is parallel with said guide, the remainder of said stock is turned inwardly to form the member 45 which is of equal length with and parallel to the member 43. The members 43, 44 and 45 comprise the frame D. The bracket E is secured by bolts as 46 to the outer face of the member 45. Said bracket and the members 45 and 43 are centrally bored to journal the revoluble shaft 47 which mounts the rotary member 48 that is fast thereto.

Referring to Figure 5 it will be noted that the pinion 49 is secured to the shaft 47 by the key 50 indicated in dotted lines. The pinion 51 is mounted on the vertical shaft 52 and engages the pinion 49 from above, the spacer 53 is interposed between the pinion 51 and the step member 54. The member 55, integral with said bracket, contacts with the hub 56 of the pinion 51 to retain said pinion securely intermeshed with the pinion 49.

The member 57 projecting downwardly from said bracket carries the flange 58 which connects with the upper outer corner of the plow element 29 at a suitable spatial distance below the frame D; said element and flange being secured by a bolt as 59, or by other suitable means.

The shaft 52 is held against axial displacement by the collar 60 spaced below the U-bracket 61. It is further supported in its vertical position by pinion 62. The collar 60 and the pinion 62 are secured to the shaft 52 by pins.

The pinion 51 is arranged for axial displacement on the shaft 52 by provision of the feather 63 which engages both the pinion 51 and the spline 64 formed longitudinally of said shaft in a manner well shown in Figures 6 and 7.

The guide 38 is suitably bent to form the frame F that carries the bearing bracket G. Said frame and bracket journal the revoluble shaft 65 which carries the rotary member 66. The shaft 65 is driven by the pinion 67 acted on by the pinion 68 that has feather and spline engagement with the vertical shaft 69 similar to that shown in Figure 5. The upper end of the shaft 69 is provided with the collar 70 spaced below the U-bearing 72, to be described. The shaft 69 is supported on the U-bearing 72 by the pinion 71. The collar 70 and the pinion 71 are pinned to the shaft 69.

The flange 73 provides connection between the outer corner of the plow element 30 and the bracket G when bolted together.

The longitudinally-slatted table 74 projects rearwardly from the rear ends of the inner guides 39 and 40, is preferably level with the upper edges thereof, is suitably spaced above said plow elements and of sufficient width for the outer edges thereof to cooperate with the respective rotary members 48 and 66 while said members are tilting the beets crosswise onto said table.

The rotary element 75 is disposed transversally of the implement at a suitable level above said table and parallel therewith, being so arranged that when rotated clockwise, as viewed in Figure 1, said element will engage a double stream of beets flowing toward said element, will sweep them off said table and deposit them crosswise, heads to heads, upon the conveyor 76 for further disposal.

As illustrated, the element 75 represents a four-vaned flexible brush of piassaba or other suitable material. Obviously said element may be of any material or construction that will engage the beets and transfer them from the table 74 to said conveyor. The element 75 is carried by the revoluble shaft 77 journaled in suitable bearings carried by the free ends of the respective arms 78 and 79 that are secured to the standard 25, as well shown in Figures 1 and 2. The bevel pinion 80 is fast to the end of the shaft 77 projecting outwardly from the arm 79 and engages the pinion 81 that is fast to the vertical shaft 82 journaled in the bracket 83 that is suitably secured to said arm. The sprocket 84 is provided fast on the shaft 82, being interposed contactually between the pinion 81 and the lower member 85 of said bracket.

The sprocket 84 is driven by the chain 86 which, in turn, is driven by the sprocket 87, that is carried by the shaft 69 and provided with a spline and feather engagement, an arrangement permitting axial displacement of the sprocket 87, which is held in its relative position in relation to the bearing bracket G by the member 88, slidable upon the shaft 69.

It will be noted by Figure 2 that the shaft 89 extends across the frame 15 and is journaled in bearings as 90, 91, 92 and 93. The shaft end 94 projects suitably beyond the bearing 90 to mount the loose sprocket 95 retained in place by the collar 96. Conventional clutch elements, as 97, too well known to need detailed description, are provided on the inner side of the sprocket 95 to coact with the complemental clutch element 98 keyed for slidable movement on the shaft 89 under actuation of the shift lever 99. The chain 100 driven by the sprocket 101 fast to the axle 22 drives the sprocket 95 when the implement is in forward motion.

The bevel pinion 102 fast on the shaft 89 engages said pinion 62 which is fast to the vertical shaft 52 journaled in the U-bearing 61 that, in turn, is journaled on the shaft 89.

The bevel pinion 103 also fast on the shaft 89 engages said pinion 71 which is fast on the vertical shaft 69 journaled in the U-bearing 72, that, in turn, is journaled on the shaft 89. From the foregoing it will be noted that the respective U-bearings 61 and 72 cooperate to aline and to form additional supports for the respective shafts 52 and 69.

The members 104, 105 and 106 form a tripod to brace the upper portion of the standard 25 against forward or lateral thrusts, the guide-bearing 26 being removably secured by bolts as 107 to the conjunctural section where said braces join together.

The rear braces, 105 and 106 form support for the bearings 91 and 92, thereby giving ample support for the shaft 89 which journals the respective vertical shafts 52 and 69.

The member 107' bridges the upper portions of said rear braces and carries the vertical standards 108 and 109 which journal the horizontal shaft 110 carrying the segment 111 fast thereto. The shaft 110 is rockable by the control lever 112 which engages a suitable detent as 113. The flexible member 114 is shown secured to the top of said standard by means of the shackle-connection 116. Said segment, flexible member, lever and detent merely illustrate efficient means to raise, lower and hold said standard at various levels, obviously other means to effect this purpose may be used without departing from the spirit of my present invention.

It will be noted that the guide-bearing 27 is secured to the front face of the cross frame member 117.

In the operation of my implement; assuming that a tractive agent is connected with the draw member 117'' and that both the tractor and the implement are presented in line with a beet bed having a double row of beets to be operated on;

Assuming that the implement has been brought to the end of the bed with the lever 112 in the down position and that the standard 25 is elevated to the highest inoperative position and that said plow elements and related parts are all clear of the ground;

The lever 112 is now released and, as the tractive agent starts said plows enter the ground, a stream of beets begins to ascend the element 29 simultaneously with a parallel stream of beets that ascend the element 30. The respective guides 37 and 39 prevent the beets falling off the element 29.

The respective guides 38 and 40 prevent the beets falling off the element 30. The surplus dirt falls off said elements over their edges outwardly and through the opening 36.

The drive sprocket 101 drives the chain 100 which acts on the sprocket 95. The shift lever 99 is now moved to engage the clutch elements 97. The pinion 102 acts through the pre-described mechanism to drive the rotary member 48 in the direction of the indicating arrow thereon. Said member is adapted by construction and arrangement to engage the beets ascending the element 29 and tilt them crosswise, heads disposed inwardly upon the table 74.

Meanwhile the stream of beets that are ascending the element 30 travel up between the respective guides 38 and 40 and are tilted onto said table crosswise head-on to the beets that traveled up the element 29, being tilted by the rotary member 66 which is driven through pre-described mechanism from the pinion 103.

While these acts are taking place the element 75 is being revolved in the manner described to transfer the beets from said table to the conveyor 76 driven by the gear 118 acting on the pinion 119 adapted to rotate the shaft 120 counter clockwise. The sprocket 121 fast to the shaft 120 engages the spaced slats 122 of the conveyor 76 from beneath, thus moving the upper flight of the conveyor counter clockwise. The lower end of the conveyor engages the sprocket 123 fast to the shaft 124 suitably carried by supports as 125 depending from the frame 15. The lower flight of the conveyor is supported by an idler as 126 carried by the shaft 126'. The rear portion of the conveyor is not shown but may well lead to means for decapitating the beets and means to dispose of the severed heads and bodies which means forms no part of the present invention.

When the end of the bed is reached the lever 112 is pulled down and locked by said detent. This act rocks the segment 111 and raises the standard 25 from the operative to the inoperative position, and with it all said enumerated and described parts. It will be noted that all said rotary members are engaged for actuation by travel of the implement and engagement of the clutch element 98.

The rotary members 48 and 66 may be plain rollers, may be faced with fabric or otherwise adapted to engage the beets and tilt them.

There are many slight and immaterial changes which might be resorted to in carrying out the present invention without detracting from any of its advantages, and hence it is to be understood that I do not limit myself to the precise construction herein shown and described, but consider myself entitled to all such variations as properly come within the spirit and scope of the invention.

Having thus described my invention, what I claim as new, and desire to secure by Letters Patent, is:

1. An implement of the kind described, comprising a structural frame, ground-engaging wheels supporting the frame, a vertically-displaceable unitary structure carried by the forward portion of the frame, said unit including a standard adapted for pre-determined up and down movement, plow elements secured to the standard and extending upwardly and rearwardly therefrom; a lateral support connected to said standard and extending suitably outward upon the far side thereof, and an additional support extending from said standard in the opposite direction to form a pair; a guide means connected to the first-mentioned support and extending rearwardly above the outer portion of the far plow element and, additional guide means connected to said additional support to form a pair of outer guide means; an inner guide means secured to said standard, being disposed rearwardly above an inner portion of the far plow element, and an additional inner guide means connected to said standard and disposed rearwardly above an inner portion of the near plow element; the two inner guide means being suitably spaced apart from each other, the two outer guide means being suitably spaced apart from their respective cooperating inner guide means; all the respective guide means being disposed in spaced relationship to said plow elements.

2. In a beet harvester as specified in claim 1, arched lateral supports extending in opposite directions from a vertically-displaceable standard and movable in unison therewith.

3. An implement for the purpose specified characterized by a structural frame, a vertically-displaceable standard carried by the forward portion of the frame, plow elements displaceable in unison with and by said standard, inner guide means connected to said standard above and in spaced relationship to said plow elements, the combination therewith of, a table supported by said inner guide means adjacent their rear ends.

4. In an implement of the class specified including a vertically-displaceable standard carried by a travelable frame structure, a plow element secured at each side of the standard, a table supported by inner guide members; the combination therewith of, a frame device supported from said standard on the far side of the implement, a bearing bracket carried by said device, said device and bracket journaling a revoluble shaft the rear end of which protrudes into said bracket and is provided with an actuator adapted to revolve said shaft when suitably engaged with a complemental driver, a rotary member mounted concentrically on said shaft and fast thereto, said member adapted to engage beet bodies and coact with the adjacent table edge to tilt said beets crosswise on said table; and an additional frame device and bearing bracket similarly disposed on the near side of the implement, said additional device and bearing bracket journaling a revoluble shaft the rear end of which protrudes into said additional bracket and is provided with an actuator adapted to revolve said shaft when suitably engaged with a complemental driver, a rotary member mounted concentrically on said shaft and fast thereto, said respective devices, brackets, rotary members and cooperative parts forming a left and right pair.

5. In an implement for the purposes set forth, the combination of a structural frame, a drive shaft, means carried by said shaft to actuate a revoluble cross shaft supported by the frame structure, a depending U-bearing journaled on said shaft toward the far side of the implement, a vertical revoluble shaft journaled in said U-bearing, a drive member fast to the cross shaft and engaging a complemental driven member fast to said vertical shaft, means journaling the lower portion of said vertical shaft in a member extended from a bearing bracket adapted for vertical displacement, a spline on the lower portion of said shaft, a drive member carried by said lower portion and engaging a complemental actuator disposed within said bearing bracket and adapted to revolve a rotary member; an additional U-bearing journaled on said cross shaft toward the near side of the implement, a vertical revoluble shaft journaled in said additional U-bearing, a drive member fast to said cross shaft and engaging a complemental driven member fast to said vertical shaft, means journaling the lower portion of said vertical shaft in a member extending from a bearing bracket adapted for vertical displacement, a spline on the lower portion of said shaft, a drive member carried by said lower portion and engaging a complemental actuator disposed within said additional bearing bracket and adapted to revolve a rotary beet-tilting member.

6. In an implement of the class described, a revoluble vertical shaft, a drive member mounted thereon, means to retain said member at a stationary level, spline-and-feather engagement between said shaft and member, a rotary element connected to a vertically-movable structure, said element disposed transversally of the axis of said implement, and in suitable spaced relationship to a beet receiving table, and suitably rotated to remove beets therefrom; articulated parts coacting with said drive member to actuate said rotary element.

7. In an implement as specified in claim 6, a longitudinally-slatted table arranged to receive beets, and a flexible rotary element adapted to coact with said table in removing beets therefrom.

8. An implement for the purpose set forth, comprising in combination, a structural travelable frame, a composite unit carried by the forward portion of said frame, said unit including a vertically-displaceable standard, braces secured to said frame and adapted to prevent longitudinal or lateral displacement of said standard, upper and lower guide bearings controlling the movement of said standard, and means supported by said braces to move said standard vertically and lock it at various levels.

9. An implement as specified in claim 6 comprising in combination, a beet receiving table, a transverse rotary element adapted and arranged to contact with beets reposing on said table and remove them to a conveyor in transverse order.

JULIUS HARGENS.